United States Patent
Hiatt

(10) Patent No.: US 6,241,057 B1
(45) Date of Patent: Jun. 5, 2001

(54) HYDRAULIC PARKING BRAKE LEVER ARRANGEMENT FOR A RAILROAD VEHICLE BRAKING SYSTEM

(75) Inventor: Anthony R. Hiatt, DeMotte, IN (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/204,910

(22) Filed: Dec. 3, 1998

(51) Int. Cl.[7] .................................................. B60T 11/10
(52) U.S. Cl. .................................. 188/219.1; 188/153 R; 188/52; 188/233.7
(58) Field of Search .................................... 188/365, 366, 188/361, 153 R, 153 A, 153 D, 107, 54, 233.7, 228.6, 279.6, 219.1

(56) References Cited

U.S. PATENT DOCUMENTS

| | | | |
|---|---|---|---|
| 3,107,754 | * 10/1963 | Bachman | 188/233.7 |
| 3,944,286 | * 3/1976 | Engle et al. | 303/9 |
| 4,175,793 | * 11/1979 | Clemmons | 188/153 R |
| 4,201,277 | * 5/1980 | Meier et al. | 188/153 R |
| 4,312,428 | * 1/1982 | Beacon | 188/219.1 |
| 4,733,602 | * 3/1988 | Smith et al. | 92/27 |
| 5,361,876 | * 11/1994 | Haverick et al. | 188/219.1 |
| 5,701,975 | * 12/1997 | Hawryszkow | 188/52 |

* cited by examiner

*Primary Examiner*—Matthew C. Graham
(74) *Attorney, Agent, or Firm*—James Ray & Associates

(57) ABSTRACT

A hydraulic parking brake assembly for a railroad vehicle braking system comprising a hydraulic actuator capable of being mounted on or engagable with the braking system and a lever arrangement connected to the hydraulic actuator which moves in accordance with activation of the hydraulic actuator and initiates a braking sequence. The lever arrangement is associated with the force transfer lever of the air cylinder such that upon movement of the lever arrangement, a force is applied to this force transfer lever causing this force transfer lever to rotate in a counterclockwise direction to apply the appropriate forces to the push rod within the brake cylinder and to a force transmitting member within the braking system to effect activation of the parking brake assembly.

19 Claims, 6 Drawing Sheets

HYDRAULIC PARKING BRAKE LEVER ARRANGEMENT FOR A RAILROAD VEHICLE BRAKING SYSTEM

FIELD OF THE INVENTION

The present invention relates, in general, to a parking brake arrangement for a railroad vehicle type braking system and, more particularly, this invention relates to a hydraulic type parking brake lever arrangement for a railroad vehicle braking system, especially truck mounted brake assemblies.

BACKGROUND OF THE INVENTION

As is generally well known in the railway industry, when railway cars are taken out of a train and parked at a siding or yard, the hand brake or parking brake on at least some of these cars are applied as a precaution against unwanted or unexpected movement of the cars. A typical railway car hand brake system normally consists of an apparatus for manually applying and biasing one or more brake shoes against the tread of one or more wheels of the railway car by either turning a hand wheel or pumping a ratchet handle on a hand brake mechanism attached to the railway car.

As illustrated in FIG. 2, in truck mounted braking systems, the hand brake mechanism is usually either a cast or stamped metal gear housing usually attached to an outside end wall of the railway car and having a rotatable chain drum therein which can be rotated by turning the hand wheel to wind a brake chain onto the chain drum. The other end of the brake chain normally extends through the bottom of the gear housing and is interconnected with cable or other linkage, such as a hand brake lever, to the brake beam which carries the brake shoes such that winding of the brake chain onto the chain drum will apply tension to the brake chain and linkage as necessary to draw the interconnected brake shoes against the tread surfaces of adjacent railway car wheels and, accordingly, apply the hand brake as intended.

A disadvantage of this prior art type hand brake arrangement is that operation of the handwheel requires exerting a considerable amount of physical force from an awkward position. This, in turn, makes the hand brake difficult to apply and could present a possible injury hazard.

SUMMARY OF THE INVENTION

An object of the present invention is to provide a hydraulic parking brake lever arrangement for a railway vehicle braking system which is an ergonomic alternative to the currently used manually activated hand brake assemblies. The hydraulic parking brake lever arrangement of the present invention is particularly applicable to truck mounted braking systems and may be used to replace the currently used manually activated handwheel type hand brakes.

A further object of the present invention is to provide a hydraulic parking brake lever arrangement which is easy to apply and provides a reduced chance of injury to the operator applying this brake.

Briefly, and in accordance with the forgoing objects, the invention comprises a hydraulic actuator which is mounted on the braking assembly. The hydraulic actuator includes a piston which moves outward from the hydraulic actuator upon activation of the actuator. The piston includes a connecting means, such as in the form of a clamp, which is connected at its end opposite from the hydraulic actuator. This connecting means is attached to a lever arrangement and the lever arrangement is associated with the force transfer lever of the air cylinder. Activation of the hydraulic actuator causes the lever arrangement to apply a force to the force transfer lever causing this force transfer lever to rotate in a counterclockwise direction to apply the appropriate forces to the push rod within the brake cylinder and to the slack adjuster assembly in order to effect activation of the parking brake assembly.

The hydraulic actuator of the invention may be mounted in a variety of locations and in a variety of directions within the braking assembly. Depending upon the mounting location and direction of the hydraulic actuator, several different lever arrangements may be used in order to achieve the counterclockwise rotation of the force transfer lever of the air cylinder assembly in order to apply the appropriate forces to the push rod and the slack adjuster so that actuation of the parking brake assembly can be achieved.

Although a number of objects and advantages of the present invention have been described in some detail above, various additional objects and advantages of the hydraulic parking brake lever arrangement of the present invention will become more readily apparent to those persons who are skilled in the art from the following more detailed description of the invention, particularly, when such detailed description of the invention is taken in conjunction with both the attached drawing figures and with the appended claims.

DETAILED DESCRIPTION OF THE INVENTION

Figure 1:
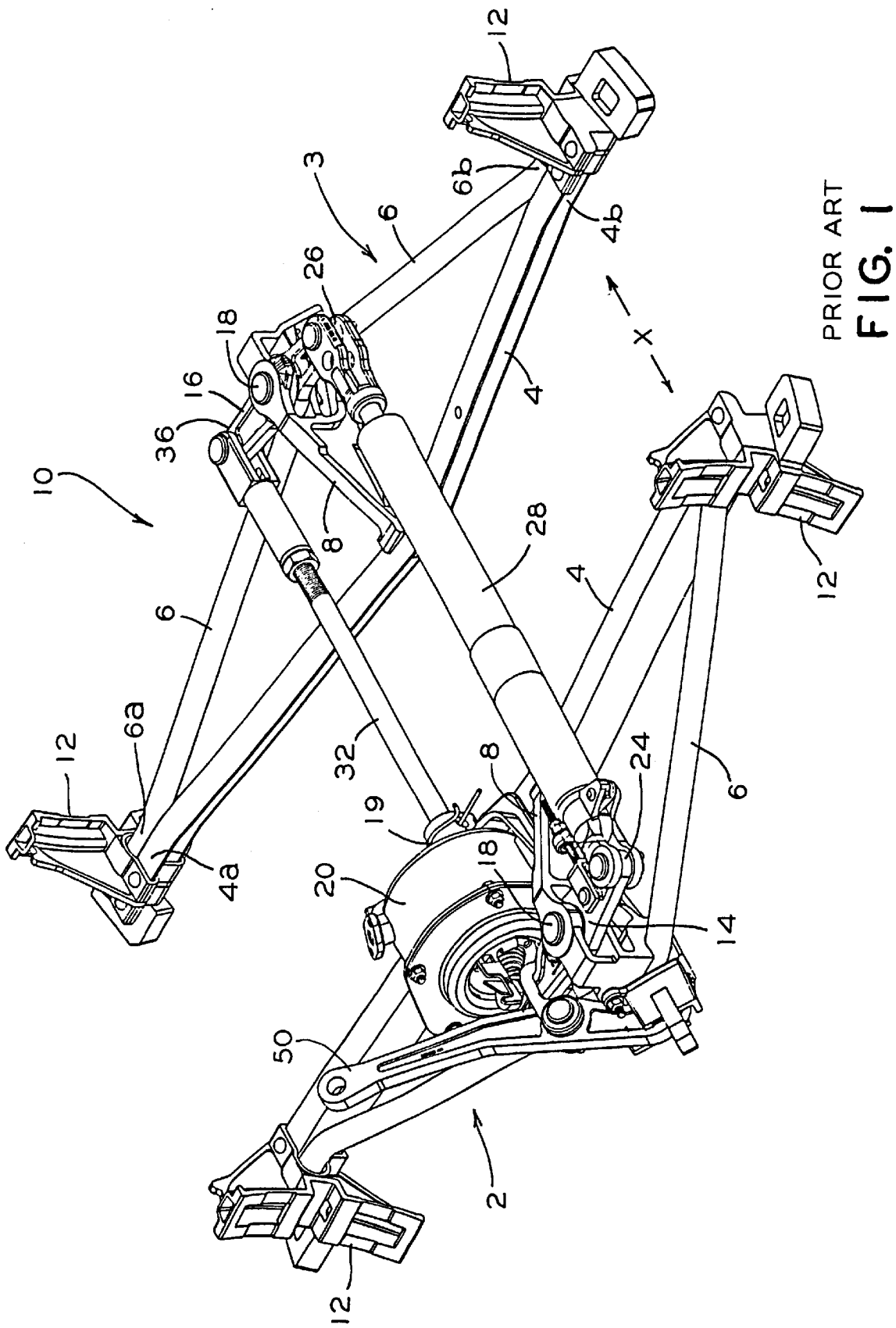
FIG. 1 is a plan view which shows a truck-mounted brake assembly including a conventional handbrake lever as is described above, and is accordingly labeled "Prior Art".

Prior to proceeding with the more detailed description of the present invention, a description of a truck mounted braking system and its functioning should prove helpful in understanding the present invention. Also, it should be noted that for the sake of clarity, identical components which have identical functions have been identified with identical reference numerals throughout the several views illustrated in the attached drawing figures.

Referring to FIG. 1, there is shown a truck-mounted brake assembly, generally designated 10, for a railway car (not shown) including a conventional handbrake lever 50. This brake assembly 10 comprises brake beams, generally designated 2 and 3, which are substantially identical, each comprising a compression member 4, a tension member 6, and a strut member 8. The opposite ends of the compression member 4 and the tension member 6 may be permanently connected together, preferably by welding along an outer segment 4a–6a, 4b–6b at the opposite ends of the compression member 4 and the tension member 6. At a location midway between their opposite ends, the compression member 4 and the tension member 6 of the respective beams 2 and 3 are spaced apart sufficiently to allow connection of the strut member 8 therebetween. Mounted on the respective outer end segments 4a–6a and 4b–6b of the brake beams 2 and 3 are brake heads 12.

A pair of force-transfer levers 14 and 16 are pivotally connected by pins 18 to the strut member 8 of the respective brake beams 2 and 3. Each end 24 and 26 of the respective force-transfer levers 14 and 16 is interconnected via the force-transmitting member 28, which may be in the form of an automatic slack adjuster device. The opposite end 36 of the force-transfer lever 16 is connected to the pressure head 19 of the brake cylinder assembly 20 via a force-transmitting member or a return push rod assembly 32.

Figure 1A:
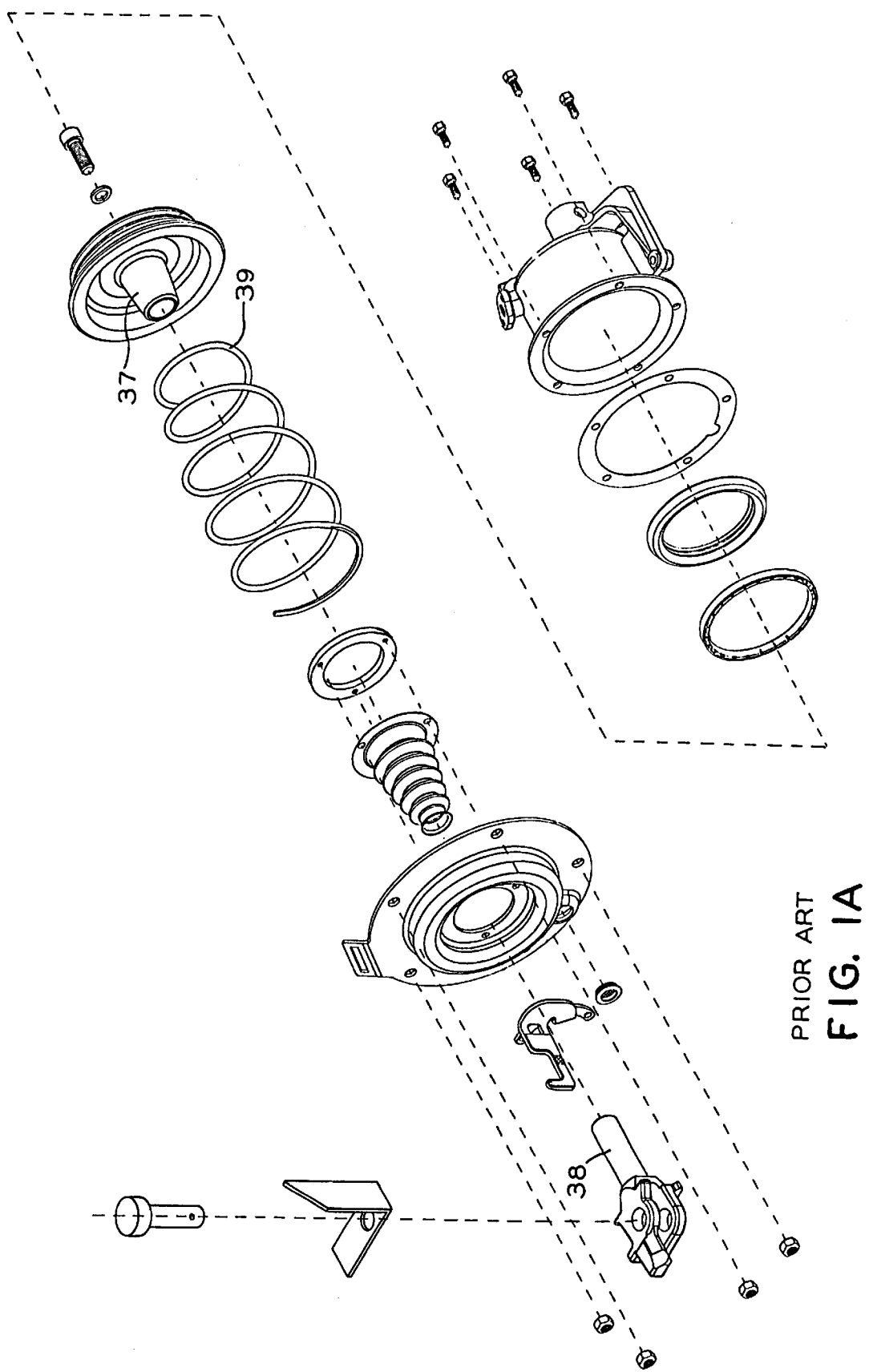
FIG. 1A is an expanded view of the brake cylinder illustrated in FIG. 1 which is currently in use and is accordingly label "Prior Art".

Referring to FIG. 1A of an expanded view of the brake cylinder of FIG. 1, a piston rod 37 of the brake cylinder assembly 20 is connected to the end of a push rod 38 which is, in turn, connected to the force transfer lever 14. The brake cylinder assembly 20 is connected to the strut member 8 adjacent one side thereof and to the compression member 4 in the space between the compression member 4 and the tension member 5. The weight of the brake cylinder device and the force-transmitting members is thus carried by the brake beams 2 and 3, which are, in turn, supported by the truck side frame (not shown).

When a brake application is made, pressurization of the brake cylinder assembly 20 results in actuation of the brake cylinder piston rod 38 located in the brake cylinder assembly 20. This actuation of the piston rod 38 causes a spring 39, also located in the brake cylinder assembly, to compress, resulting in movement of a push rod 38 in a direction to effect counterclockwise rotation of the force-transfer lever 14. The force-transfer lever 14, in turn actuates the slack adjuster assembly 28 to effect counterclockwise rotation of the force-transfer lever 16 and consequent actuation of the return push rod assembly 32.

The force-transfer levers 14 and 16, along with the slack adjuster assembly 28, the return push rod assembly 32, and the brake cylinder assembly 20 comprise a brake beam actuating linkage that interconnects the brake beams 2 and 3 via pivot pins 18 and thus the required brake actuation forces effectively act along these pins 18. The resultant of these forces is shown at X. Since the length of the slack adjuster assembly 28 increases with actuation of the brake cylinder piston rod 37, it follows that brake beams 2 and 3 are moved apart by the brake beams linkage until the brake shoe engagement with the tread surface of the vehicle wheels occurs.

During a parking situation when the railway cars are taken out of the train and parked at a siding or yard, the pneumatic braking system, as described above, can no longer be used. Thus, in order to apply the brake as a precaution against unwanted or unexpected movement of the cars, a hand brake mechanism, which is mounted on each car, can be employed.

Figure 2:
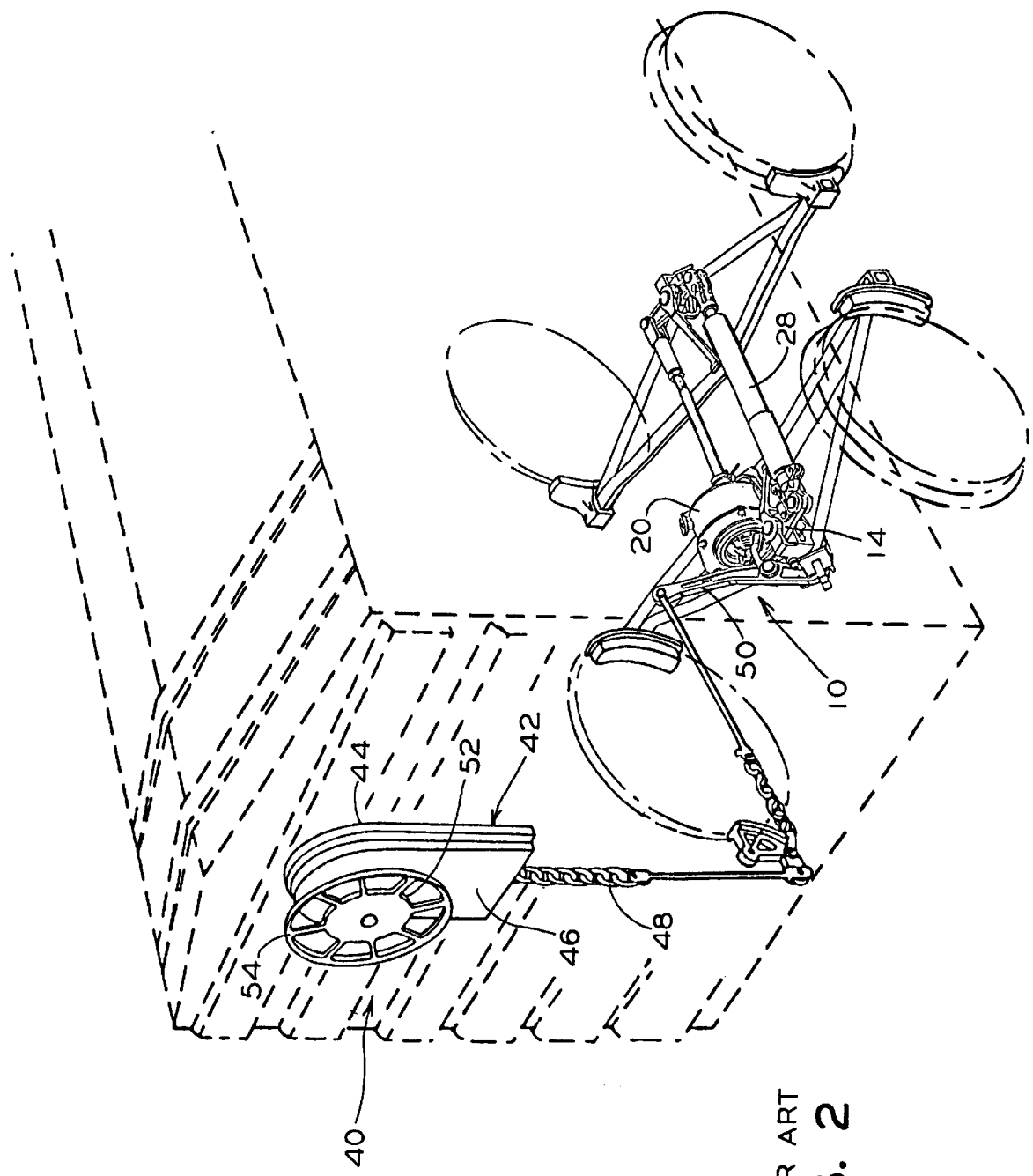
FIG. 2 is a plan view which shows a truck-mounted brake assembly having a conventional prior art handwheel hand brake or parking brake, as described above, and is accordingly labeled "Prior Art".

Referring to FIG. 2, a currently used handbrake mechanism, generally designated as 40, on a truck-mounted brake assembly is shown. The brake mechanism 40 has a housing, generally designated as 42, which comprises a back plate or wall 44, mountable on a railway car, and a cover 46. The cover 46 is secured to the back wall 44.

A chain 48, for application or release of the brakes, is connected, as is conventional, to the brake rigging via a hand brake lever 50, which chain 48 is attached to and wound on a winding drum 52. The hand brake lever 50 is, in turn, connected to an air cylinder transfer lever or force transfer lever 14.

In order to apply the brakes, a hand wheel 54 is rotated in a clockwise direction to wind the chain 48 about the winding drum 52 and to cause the hand brake lever 50 to be pulled in an outward direction away from the brake rigging 10. This causes the force transfer lever 14 to be rotated in a counterclockwise direction resulting in the piston push rod being pulled in an outward direction and the required force being applied to the slack adjuster assembly 28. This force is similar to the force which is applied by the brake cylinder piston rod, not shown, of the air cylinder assembly 20 when such is pressurized.

Figure 3:
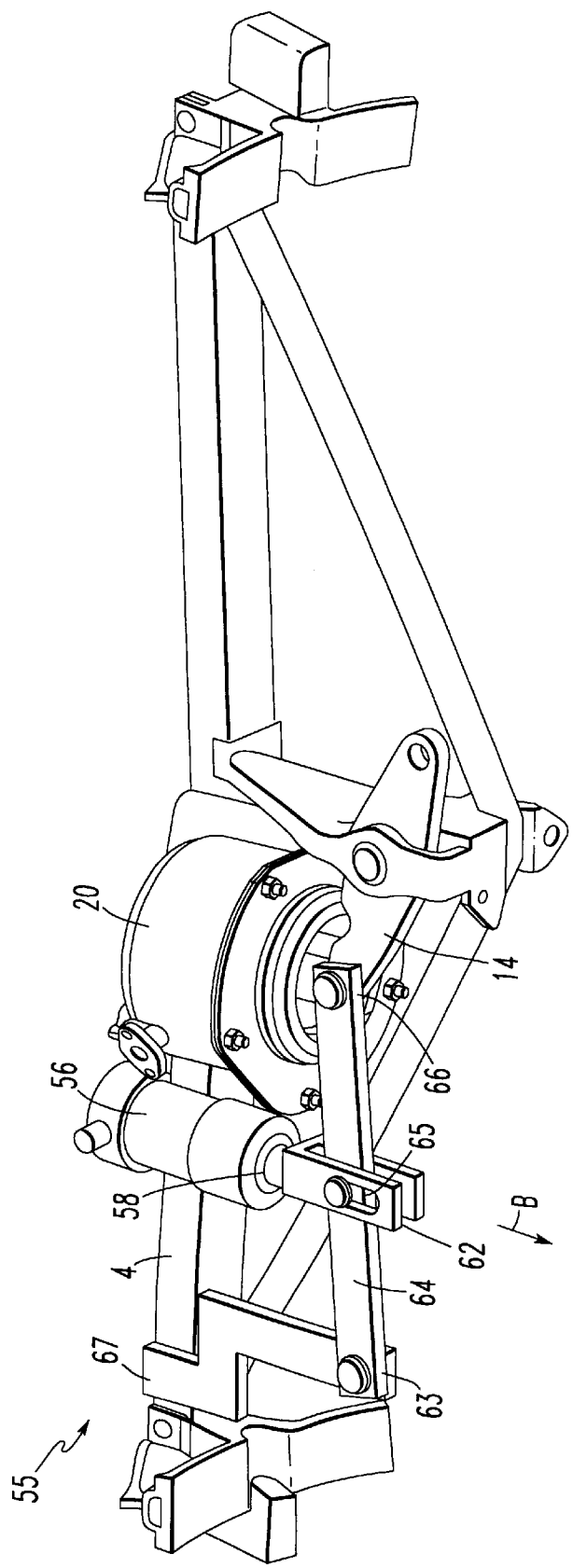
FIG. 3 is a partial plan view illustrating an end portion of the truck mounted brake assembly of FIG. 1 having the hydraulic parking brake lever arrangement according to a first embodiment of the present invention mounted thereon.

The present invention would replace this manually actuated hand wheel/chain/hand brake lever system with a hydraulic parking brake lever arrangement. FIG. 3 shows the hydraulic parking brake lever arrangement, according to a first embodiment of the present invention, mounted to an end portion of a truck mounted brake assembly, generally designated as 55. In this embodiment, a hydraulic actuator 56 is mounted alongside the air cylinder 20. This hydraulic actuator 56 includes a piston 58 for movement outwardly from the hydraulic actuator 56 upon activation of such hydraulic actuator 56.

Any well known liquid may be used for activating this hydraulic actuator such as water, oil, and the like. The piston 58 includes a connecting means 62, such as a clamp, for connecting the piston 58 to a center portion or at a midpoint 65 of a lever 64. The lever 64 is pivotally connected at its outboard end 63 to a fixed bracket 67. This bracket 67 is attached to the compression member 4 of the brake assembly. The lever 64 is also pinned at its inboard location 66 to the air system push rod, element 38 as shown in FIG. 1A, as well as, the force transfer lever 14. The force transfer lever 14 is connected to a slack adjuster assembly 28, as illustrated in FIG. 1.

Upon activation of such hydraulic actuator 56, a force is applied to the piston 58 which causes the lever 64 to be forced outward from the braking assembly, as shown by arrow B. This outward movement of the lever 64 causes the force transfer lever 14 to rotate in a counterclockwise direction causing the air cylinder push rod 38 to move in an outward direction and to apply an inward force to the slack adjuster assembly 28, thus causing a chain reaction, similar to what occurs during an air cylinder activated braking situation, to activate the parking brake assembly.

Figure 4:
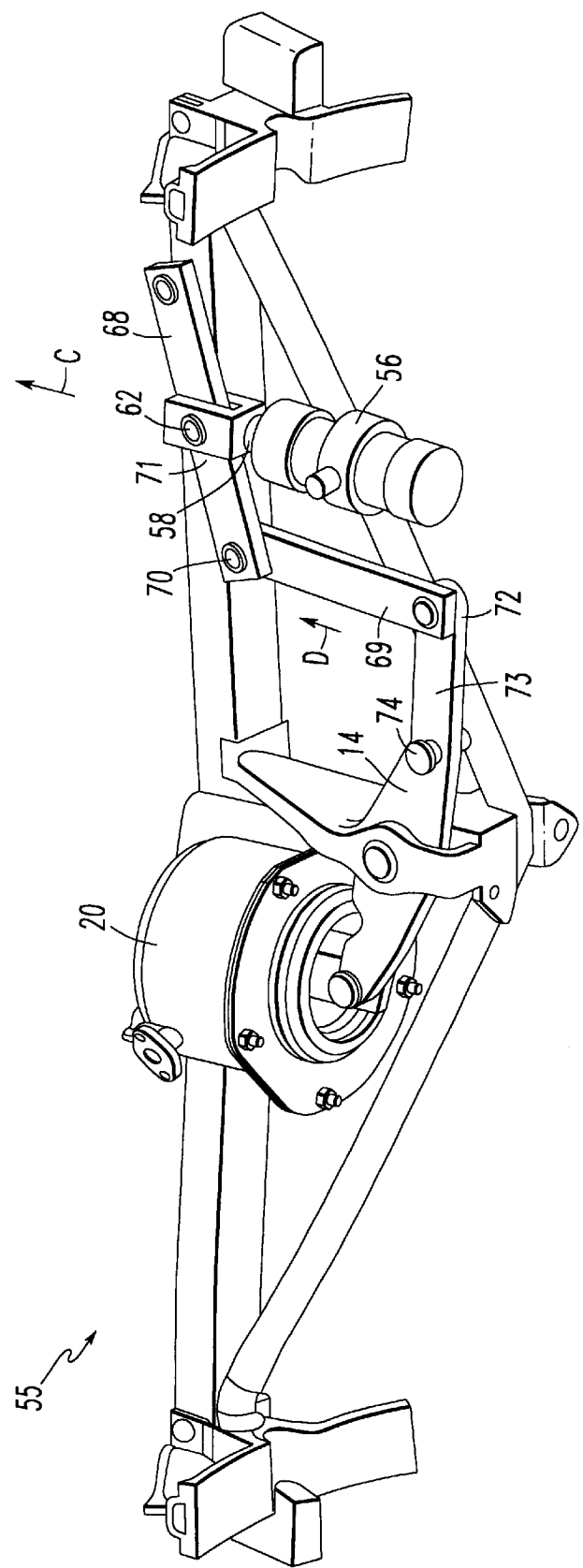
FIG. 4 is partial plan view illustrating an end portion of the truck mounted brake assembly of FIG. 1 having the hydraulic parking brake lever arrangement according to a second embodiment of the present invention mounted thereon.

FIG. 4 shows the hydraulic parking brake lever arrangement according to a second embodiment of the present invention. In this embodiment, the hydraulic actuator 56 is mounted opposite the air cylinder 20 and oriented toward the truck bolster (not shown). This embodiment of the parking brake lever arrangement includes two lever members 68 and 69 pivotally connected at 70. The piston of the actuator 56 is connected to a first member 68 of the lever arrangement substantially at its midpoint 71.

Actuation of the hydraulic actuator 56 causes the piston 58 to apply a force so as to cause the first and second lever members 68 and 69, of the lever arrangement, to move inwardly toward the brake assembly, as shown by arrow C. The inboard end 72 of the second lever member 69, of the lever arrangement, is linked to an extension lever 73 of the slack adjuster end 74 of the force transfer lever 14. Thus, the inward movement of the first and second lever members 68 and 69 of the lever arrangement causes the extension lever 73 to apply a force, as depicted by arrow D, causing the force transfer lever 14 to rotate in a counterclockwise direction and to activate the parking brake assembly in a manner similar to that of the FIG. 3 embodiment.

Figure 5:
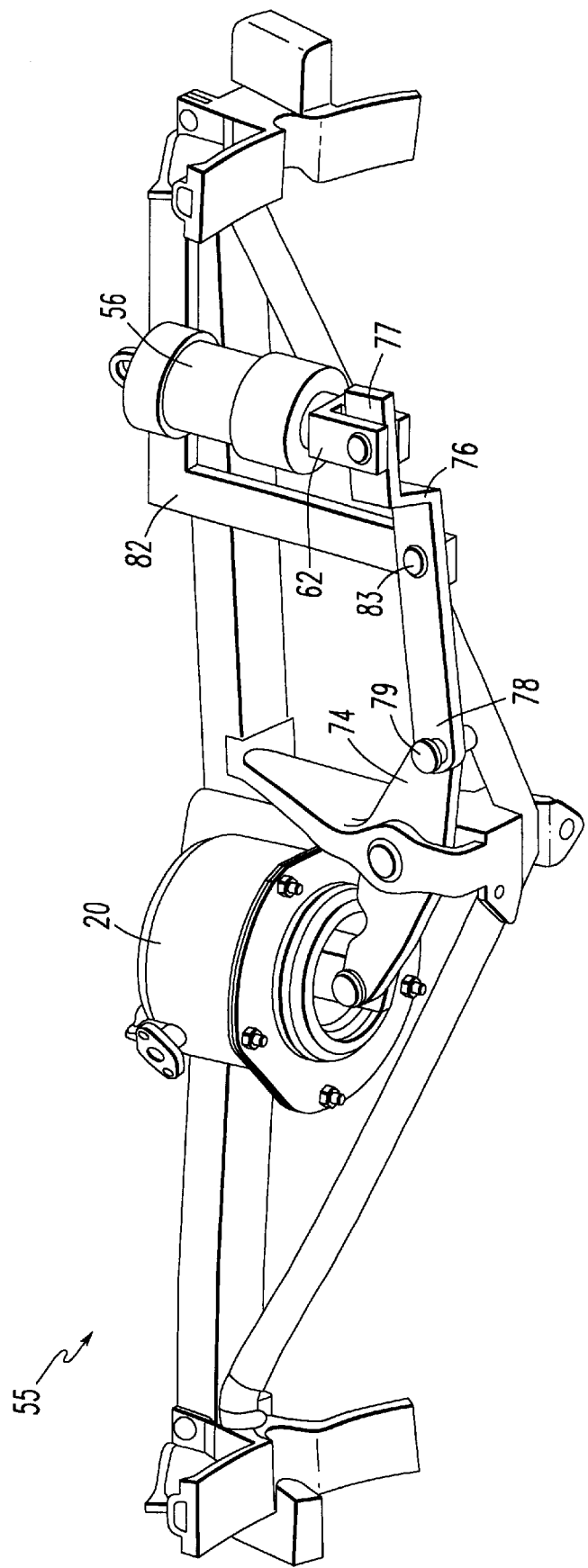
FIG. 5 is partial plan view illustrating an end portion of the truck mounted brake assembly of FIG. 1 having the hydraulic parking brake lever arrangement according to a third embodiment of the present invention mounted thereon.

FIG. 5 shows a third embodiment of the hydraulic parking brake assembly, according to the present invention, in which the hydraulic actuator 56 is mounted opposite or at a remote location from the air cylinder 20 and oriented toward the axle (not shown).

The piston of the hydraulic actuator 56 is connected via connecting means 62 to the outboard end 77 of a 2:3 ratio lever 76. The opposite end 78 of this 2:3 ratio lever 76 is pinned at 79 to the slack adjuster end 74 of the force transfer lever 14. The 2:3 ratio lever 76 is also pivotally connected at 83 to a fixed bracket member 82. Activation of the hydraulic actuator 56 causes the 2:3 ratio lever 76 to move outward from the brake assembly, as depicted by arrow E, and due to the 2:3 ratio lever 76 being pivotally connected to the fixed bracket member 82, the 2:3 ratio lever 76 rotates in a clockwise direction and resultantly causes the force transfer lever 14 to rotate in a counterclockwise rotation. This counterclockwise rotation applies a force to the air cylinder push rod 38 and the slack adjuster assembly 28 which causes the parking brake assembly to be activated.

Thus, the present invention has been described in such full, clear, concise and exact terms as to enable any person skilled in the art to which it pertains to make and use the same. It will be understood that variations, modifications, equivalents, and substitutions for components of the specifically described embodiments of the invention may be made by those skilled in the art without departing from the spirit and scope of the invention as set forth in the appended claims.

I claim:

1. A hydraulic parking brake assembly for a railroad vehicle braking system, said railroad vehicle braking system including an air cylinder, a push rod located within said air cylinder, an air cylinder transfer lever connected to an end of said push rod, and at least one force transmitting member, said hydraulic parking brake assembly comprising:
   (a) a hydraulic actuator engageable with said braking system, said hydraulic actuator including a hydraulic piston member disposed for movement in an outwardly direction from said hydraulic actuator upon activation of said hydraulic actuator;
   (b) a connecting means having a first end and a second end, said first end being disposed on said hydraulic piston at a location remote from said hydraulic actuator; and
   (c) a lever arrangement attached to said second end of said connecting means such that at least a portion of said lever arrangement moves in accordance with movement of said hydraulic piston, said lever arrangement being associated with said air cylinder transfer lever such that upon activation of said hydraulic actuator, said lever arrangement causes said air cylinder transfer lever to rotate and apply a force to said push rod and said at least one force transfer lever to achieve activation of said parking brake assembly.

2. A hydraulic parking brake assembly for a railroad vehicle braking system, as recited in claim 1, wherein said at least one force transmitting member comprises a slack adjuster assembly.

3. A hydraulic parking brake assembly for a railroad vehicle braking system, as recited in claim 1, wherein said hydraulic actuator is capable of being mounted alongside said air cylinder such that actuation of said hydraulic actuator causes said at least a portion of said lever arrangement to move in an outward direction with respect to said vehicle braking system.

4. A hydraulic parking brake assembly for a railroad vehicle braking system, as recited in claim 3, wherein said lever arrangement includes:
   a bracket member fixedly attached to said vehicle braking system; and
   a lever member, said lever member having an outboard location, an inboard location, and a midpoint location, said outboard location being pivotally connected to said bracket member, said inboard location being pivotally connected to said air cylinder transfer lever and said midpoint location being attached to said hydraulic piston via said connecting means.

5. A hydraulic parking brake assembly for a railroad vehicle braking system, as recited in claim 1, wherein said hydraulic actuator is capable of being mounted opposite said air cylinder such that actuation of said hydraulic actuator causes said at least a portion of said lever arrangement to move in an inward direction with respect to said vehicle braking system.

6. A hydraulic parking brake assembly for a railroad vehicle braking system, as recited in claim 5, wherein said lever arrangement includes an extension member and a lever member, said extension member having a first location and a second location, said first location of said extension member being pivotally connected to said air cylinder transfer lever and said second location of said extension member being pivotally connected to said lever member.

7. A hydraulic parking brake assembly for a railroad vehicle braking system, as recited in claim 6, wherein said lever member includes a first part and a second part, said first part of said lever member having;
   an inboard end for pivotally connecting said first part with said second part;
   an outboard end for pivotally connecting said first part with said vehicle braking system; and
   a midpoint location for attachment with said connecting means of said hydraulic piston; and said second part of said lever member being attached to said extension member at a location remote from said pivotal connection of said second part with said first part.

8. A hydraulic parking brake assembly for a railroad vehicle braking system, as recited in claim 1, wherein said hydraulic actuator is capable of being mounted at a remote location from said air cylinder such that actuation of said hydraulic actuator causes said at least a portion of said lever arrangement to move in an outward direction with respect to said vehicle braking system.

9. A hydraulic parking brake assembly for a railroad vehicle braking system, as recited in claim 8, wherein said lever arrangement includes a bracket member and a lever, said bracket member having a first and second location, said first location of said bracket member being fixedly attached to said braking system and said second location of said bracket member being pivotally connected to said lever.

10. A hydraulic parking brake assembly for a railroad vehicle braking system, as recited in claim 9, wherein said lever is a 2:3 ratio lever and includes an inboard location, an outboard location, and a midpoint location and wherein said inboard location is attached to said air cylinder transfer lever, said outboard location is attached to said hydraulic piston of said hydraulic cylinder and said midpoint location is pivotally attached to said bracket member.

11. A hydraulic parking brake assembly for a truck mounted vehicle braking system, said truck mounted vehicle braking system including an air cylinder, an air cylinder push rod, an air cylinder transfer lever, and a slack adjuster assembly, said hydraulic parking brake assembly comprising:

(a) a hydraulic actuator engagable with said truck mounted vehicle braking system, said hydraulic actuator including a hydraulic piston member disposed for movement in an outwardly direction from said hydraulic actuator upon activation of said hydraulic actuator;

(b) a connecting means having a first end and a second end, said first end being disposed on said hydraulic piston at a location remote from said hydraulic actuator; and (c) a lever arrangement attached to said second end of said connecting means such that at least a portion of said lever arrangement moves in accordance with movement of said hydraulic piston, said lever arrangement being associated with said air cylinder transfer lever on said truck mounted vehicle braking system such that upon activation of said hydraulic actuator, said lever arrangement causes said air cylinder transfer lever to rotate and apply a force to said air cylinder push rod and said slack adjuster assembly of said truck mounted vehicle braking system to achieve activation of said parking brake assembly.

12. A hydraulic parking brake assembly for a truck mounted vehicle braking system, as recited in claim 11, wherein said hydraulic actuator is capable of being mounted alongside said air cylinder such that actuation of said hydraulic actuator causes said at least a portion of said lever arrangement to move in an outward direction with respect to said truck mounted vehicle braking system.

13. A hydraulic parking brake assembly for a truck mounted vehicle braking system, as recited in claim 12, wherein said lever arrangement includes:

a bracket member fixedly attached to a compression member of said truck mounted vehicle braking system; and a lever member, said lever member having an outboard location, an inboard location, and a midpoint location, said outboard location being pivotally connected to said bracket member, said inboard location being pivotally connected to said air cylinder transfer lever and said midpoint location being attached to said hydraulic piston via said connecting means.

14. A hydraulic parking brake assembly for a truck mounted vehicle braking system, as recited in claim 11, wherein said hydraulic actuator is capable of being mounted opposite said air cylinder such that actuation of said hydraulic actuator causes said at least a portion of said lever arrangement to move in an inward direction with respect to said truck mounted vehicle braking system.

15. A hydraulic parking brake assembly for a truck mounted vehicle braking system, as recited in claim 14, wherein said lever arrangement includes an extension member and a lever member, said extension,member having a first location and a second location, said first location of said extension member being pivotally connected to said air cylinder transfer lever and said second location of said extension member being pivotally connected to said lever member.

16. A hydraulic parking brake assembly for a truck mounted vehicle braking system, as recited in claim 15, wherein said lever member includes a first part and a second part, said first part of said lever member having;

an inboard end for pivotally connecting said first part with said second part;

an outboard end for pivotally connecting said first part with said vehicle braking system; and a midpoint location for attachment with said connecting means of said hydraulic piston; and said second part of said lever member being attached to said extension member at a location remote from said pivotal connection of said second part with said first part.

17. A hydraulic parking brake assembly for a truck mounted vehicle braking system, as recited in claim 11, wherein said hydraulic actuator is capable of being mounted at a remote location from said air cylinder such that actuation of said hydraulic actuator causes said at least a portion of said lever arrangement to move in an outward direction with respect to said truck mounted vehicle braking system.

18. A hydraulic parking brake assembly for a truck mounted vehicle braking system, as recited in claim 17, wherein said lever arrangement includes a bracket member and a lever, said bracket member having a first and second location, said first location of said bracket member being fixedly attached to said truck mounted vehicle braking system and said second location of said bracket member being pivotally connected to said lever.

19. A hydraulic parking brake assembly for a truck mounted vehicle braking system, as recited in claim 18, wherein said lever is a 2:3 ratio lever and includes an inboard location, an outboard location, and a midpoint location and wherein said inboard location is attached to said air cylinder transfer lever, said outboard location is attached to said hydraulic piston of said hydraulic cylinder and said midpoint location is pivotally attached to said bracket member.

* * * * *